A. F. WELCH.
ALTERNATING CURRENT MOTOR.
APPLICATION FILED NOV. 30, 1915.

1,194,103.

Patented Aug. 8, 1916.

Inventor:
Alfred F. Welch,
by Albert G. Davis
His Attorney.

UNITED STATES PATENT OFFICE.

ALFRED F. WELCH, OF FORT WAYNE, INDIANA, ASSIGNOR TO GENERAL ELECTRIC COMPANY, A CORPORATION OF NEW YORK.

ALTERNATING-CURRENT MOTOR.

1,194,103.      Specification of Letters Patent.      Patented Aug. 8, 1916.

Application filed November 30, 1915. Serial No. 64,349.

*To all whom it may concern:*

Be it known that I, ALFRED F. WELCH, a citizen of the United States, residing at Fort Wayne, in the county of Allen, State of Indiana, have invented certain new and useful Improvements in Alternating-Current Motors, of which the following is a specification.

My invention relates to alternating current motors of the commutator type and is particularly applicable to motors which start as repulsion and operate as induction motors.

My invention has for its object a novel construction of such motors in which after the motor has started, the brushes, which make the repulsion motor connection, are caused to revolve with the rotor of the motor. These brushes thus provide a revolving short-circuiting connection to the winding of the rotor in addition to that furnished by the usual switch for short-circuiting the commutator, but do not add to the friction of the machine, nor do they wear away while the machine is operating at normal speed.

The various features of novelty which characterize my invention are pointed out with particularity in the claims annexed to and forming a part of this specification. For a better understanding of my invention, reference may be had to the following description taken in connection with the accompanying drawing, in which—

Figure 1:
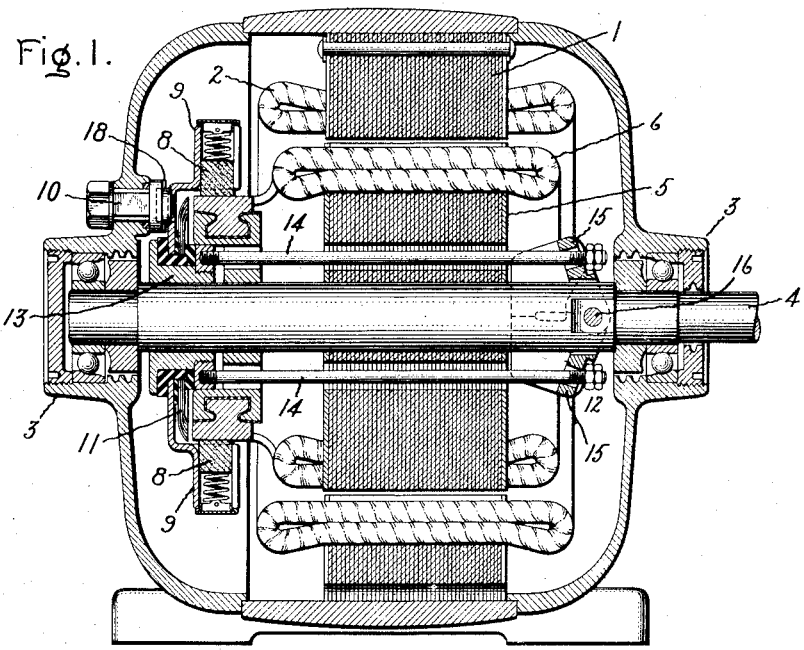
Figure 2:
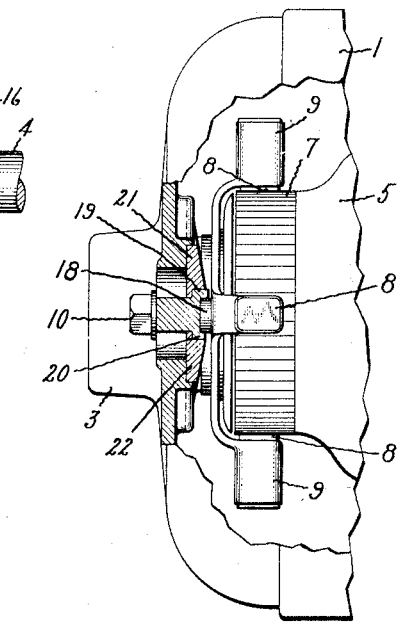
Figures 3, 4:
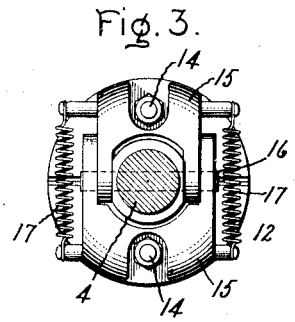

Figure 1 is a sectional view of a motor embodying my invention; Fig. 2 is a fragmental view, partly in section, of the commutator end of the motor of Fig. 1; Figs. 3 and 4 are views of a detail, and Fig. 5 is a diagram of connections.

Referring to the drawing, 1 is the stationary member of an alternating current motor which is provided with windings 2. The member 1 carries bearings 3 in which the shaft 4 of the rotor 5 is journaled. The rotor 5 has a winding 6 connected to a commutator 7 on which brushes 8 bear. These brushes are mounted in brush-holders 9, which are held stationary by means of a suitable lock 10. A switch 11 is mounted opposite the end of the commutator 7 and is moved into the position in which it short-circuits the commutator and consequently the rotor winding 6 by means of a centrifugal device 12. This centrifugal device is arranged to thus move the switch 11 when the rotor 5 reaches a predetermined speed and at the same time it releases the lock 10 and permits the brushes and brushholders to revolve with the rotor. When the speed of the rotor falls below a predetermined value the revolution of the brush-holders 9 is stopped by suitable means. In the particular arrangement shown, I have constructed the lock 10 so that it will act to so stop the brush-holders. The brushes 8 are all shown as being electrically connected together through the brush-holders. I preferably provide a sleeve 13 for releasing the lock 10 and closing the switch 11, the sleeve 13 being mounted on the shaft 4, and longitudinally movable thereon. The switch 11 as shown comprises a plurality of dish-shaped copper disks, and the switch and the brush-holder are preferably carried by a common supporting member which is so mounted on the sleeve 13 as to be rotatable relative thereto. The centrifugal device 12 is mounted on the shaft 4 preferably at the end of the rotatable member 5 away from the commutator and is operatively connected with the sleeve 13, as by means of rods 14.

The centrifugal device 12 is shown in Figs. 3 and 4 as comprising two weights 15 pivotally mounted on a pin 16 and held in their folded-in position by springs 17. The pin 16 extends through the motor shaft 4. The ends of the rods 14 are engaged by the weights 15. The brush-holders 9 are shown as being integrally connected together and provided with a projecting lug 18 which is engaged by the lock 10. The lock comprises a stud having a slot therein, the portion 19 of the stud on one side of the slot extending farther into the path of the lug 18 than the portion 20 of the stud on the other side of the slot. A guide member 21, having a cam surface 22 registering with the surface of portion 20 of the stud, is held in place by the stud.

Figure 5:
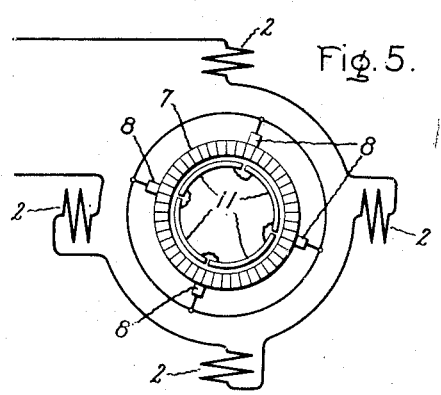

The operation of my motor will be understood from the diagram of Fig. 5, taken in connection with the other figures of the drawing. Alternating current being supplied the windings 2 on the stationary member, poles of alternating polarity are set up in the stationary member 1, whereupon currents are induced in the winding 6 connected to the commutator 7. The rotor 5 being stationary and the brushes 8 being held by the lock 10 in a suitable position between the neutral points and the points of highest potential, serve to unbalance the reactions set up by the currents in the winding 6. These unbalanced reactions cause a rotation of the rotor 5 upon what is called the repulsion principle. As the rotor 5 speeds up, the weights 15 tend to rotate on the pin 16 against the tension of the springs 17 due to centrifugal force, and tend to move the rods 14 and consequently the sleeve 13 in a longitudinal direction, that is, in a direction parallel with the axis of the shaft. As soon as the weights start to move outwardly the pull of the springs 17 decreases because their line of action moves nearer to the pin 16 and their leverage arm is reduced; consequently, when the speed of the rotor 5 approaches its normal running speed, the weights 15 move quickly to their outward position, moving the sleeve 13 to its inward position, thus moving the switch 11 into contact with the commutator 7 and short-circuiting it, and at the same time moving the lug 18 on the brush-holders out of the slot in the lock 10 and out of the path of portion 19 thereof, and causing the brush-holders and brushes to revolve with the rotor. Since the coils of the winding 6 connected to the bars of the commutator 7 are now short-circuited on themselves, and since the rotor 5 is rotating, the reactions of this winding are unbalanced producing a torque in the same direction as that produced in starting by the repulsion motion connection of this winding. The motor now runs on the induction principle, the revolving brushes forming a second short-circuit for the winding 6. The revolution of the brushes with the commutator considerably reduces the running friction of the machine and also prevents the brushes from wearing away during normal operation. If for any reason the motor slows down, as for instance, if the current is cut off from the winding 2, the weights 15 do not immediately move inwardly because of the reduced leverage arm of the springs 17. In fact the weights will not move inwardly to any appreciable extent until the speed of the member 5 is considerably reduced. Such a movement of the weights restores the pull of the spring 17 which added to that of switch 11 moves the weights 15 inwardly to their retracted position, moving the switch out of engagement with the commutator and allowing the lug 18 to engage the cam surface 22 of the guide member 21 and to move up it until it is caught by the portion 19 of the lock, whereupon the rotation of the brush-holders and brushes is stopped.

In one motor in which I have embodied my invention, the centrifugal device 11 does not operate to release the lock on the brush-holders and short-circuit the commutator until the motor reaches a speed of 1400 R. P. M. and does not restore these parts into the starting position until the speed has been reduced to 450 R. P. M.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is:—

1. In an alternating current motor, a rotor having a winding connected to a commutator, brushes bearing on said commutator, brush-holders in which said brushes are mounted, means for holding said brush-holders stationary, a switch, and a centrifugal means for moving said switch into the position in which it short-circuits said rotor winding and for releasing said holding means when said rotor reaches a predetermined speed, whereby said brush-holders and brushes revolve with said rotor.

2. In an alternating current motor, a rotor having a winding connected to a commutator, brushes bearing on said commutator, brush-holders in which said brushes are mounted, means for holding said brush-holders stationary, a switch, and centrifugal means for moving said switch into the position in which it short-circuits said rotor windings and for moving said brush-holders so as to release said holding means when said rotor reaches a predetermined speed, whereby said brush-holders and brushes revolve with said rotor.

3. In an alternating current motor, a rotor having a winding connected to a commutator, brushes bearing on said commutator, brush-holders in which said brushes are mounted, means for holding said brush-holders stationary, a switch, a longitudinally movable sleeve on which said brush-holders and said switch are mounted, and centrifugal means operatively connected with said sleeve for moving the same when said rotor reaches a predetermined speed so that said switch short-circuits said rotor winding and said holding means for said brush-holders is released.

4. In an alternating current motor, a rotor having a winding connected to a commutator, brushes bearing on said commutator, brush-holders in which said brushes are mounted, a switch, centrifugal means for moving said switch into the position in which said rotor winding is short-circuited and said brush-holders into the position in which they revolve with said rotor when the rotor reaches a predetermined speed, and means for stopping the revolution of said brush-holders when the speed of said rotor falls below a predetermined value.

5. In an alternating current motor, a rotor having a winding connected to a commutator, brushes bearing on said commutator, brush-holders in which said brushes are mounted, a switch, a longitudinally movable sleeve on which said brush holders and said switch are mounted, centrifugal means operatively connected with said sleeve for moving the same when said rotor reaches a predetermined speed so that said switch short-circuits said rotor winding and said brush-holders revolve with said rotor and means for stopping the revolution of said brush-holders when the speed of said rotor falls below a predetermined value.

6. In an alternating current motor, a rotor having a winding connected to a commutator, brushes bearing on said commutator, brush-holders in which said brushes are mounted, means for holding said brush-holders stationary, a switch, and centrifugal means for moving said switch into the position in which it short-circuits said rotor winding and for releasing said holding means when said rotor reaches a predetermined speed whereby said brush-holders and brushes revolve with said rotor, said holding means stopping the revolution of said brush-holders when the speed of said rotor falls below a predetermined value.

7. In an alternating current motor, a rotor having a winding connected to a commutator, brushes bearing on said commutator, brush-holders in which said brushes are mounted, means for holding said brush-holders stationary, a switch, and centrifugal means for moving said switch into the position in which it short-circuits said rotor winding and for moving said brush-holders so as to release said holding means when said rotor reaches a predetermined speed whereby said brush-holders and brushes revolve with said rotor, said holding means stopping the revolution of said brush-holders when the speed of said rotor falls below a predetermined value.

8. In an alternating current motor, a rotor having a winding connected to a commutator, brushes bearing on said commutator, brush-holders in which said brushes are mounted, means for holding said brush-holders stationary, a switch, a longitudinally movable sleeve on which said brush-holders and said switch are mounted, and centrifugal means operatively connected with said sleeve for moving the same when said rotor reaches a predetermined speed so that said switch short-circuits said rotor winding and said holding means for said brush-holders is released, said holding means stopping the revolution of said brush-holders when the speed of said rotor falls below a predetermined value.

In witness whereof, I have hereunto set my hand this 23d day of November 1915.

ALFRED F. WELCH.